US012395338B2

(12) United States Patent
Kim et al.

(10) Patent No.: US 12,395,338 B2
(45) Date of Patent: Aug. 19, 2025

(54) ELECTRONIC DEVICE FOR PERFORMING TOKEN PRUNING IN FREQUENCY DOMAIN AND METHOD FOR OPERATING THE SAME

(71) Applicant: Foundation for Research and Business, Seoul National University of Science and Technology, Seoul (KR)

(72) Inventors: Hyun Kim, Seoul (KR); Jong Ho Lee, Seoul (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 248 days.

(21) Appl. No.: 18/166,828

(22) Filed: Feb. 9, 2023

(65) Prior Publication Data

US 2024/0214205 A1    Jun. 27, 2024

(30) Foreign Application Priority Data

Dec. 26, 2022   (KR) ........................ 10-2022-0184327

(51) Int. Cl.
  *G06T 5/00*    (2024.01)
  *G06T 5/10*    (2006.01)
  *G06T 7/11*    (2017.01)
  *G06V 10/26*   (2022.01)
  *H04L 9/32*    (2006.01)

(52) U.S. Cl.
  CPC .............. *H04L 9/3213* (2013.01); *G06T 5/10* (2013.01); *G06T 7/11* (2017.01)

(58) Field of Classification Search
  None
  See application file for complete search history.

(56) References Cited

U.S. PATENT DOCUMENTS

| | | | | |
|---|---|---|---|---|
| 2003/0063809 A1* | 4/2003 | Andrew | ................. | G06T 9/007 |
| | | | | 382/240 |
| 2003/0142847 A1* | 7/2003 | Rhoads | ..................... | G07F 7/12 |
| | | | | 704/E19.009 |
| 2004/0170332 A1* | 9/2004 | Andrew | ................. | H04N 19/36 |
| | | | | 382/233 |

(Continued)

FOREIGN PATENT DOCUMENTS

CN         115240003 A   * 10/2022

*Primary Examiner* — Christopher B Robinson
(74) *Attorney, Agent, or Firm* — Studebaker Brackett PLLC

(57) ABSTRACT

According to various embodiment of the present disclosure, an electronic device for performing token pruning in a frequency domain may include a processor, and the processor may configured to divide an image frame into a plurality of patches, convert tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, and convert the remaining tokens other than specific tokens from the frequency domain to the spatial domain, after pruning specific tokens from the tokens based on frequency information of the tokens converted into the frequency domain. Various other embodiments are also possible.

12 Claims, 3 Drawing Sheets

(56) References Cited

U.S. PATENT DOCUMENTS

| | | | |
|---|---|---|---|
| 2013/0145239 A1* | 6/2013 | Pi | H04L 25/0224 |
| | | | 714/807 |
| 2019/0362477 A1* | 11/2019 | Rahmati | G06T 5/70 |
| 2022/0012848 A1* | 1/2022 | Ranftl | G06T 3/4046 |
| 2022/0094713 A1* | 3/2022 | Lee | G06F 18/214 |
| 2022/0114709 A1* | 4/2022 | Rahmati | G06T 5/20 |
| 2022/0277218 A1* | 9/2022 | Fan | G06N 3/08 |

* cited by examiner

ELECTRONIC DEVICE FOR PERFORMING TOKEN PRUNING IN FREQUENCY DOMAIN AND METHOD FOR OPERATING THE SAME

CROSS-REFERENCE TO RELATED APPLICATIONS

This application claims priority to and the benefit of Korean Patent Application No. 10-2022-0184327 filed in the Korean Intellectual Property Office on Dec. 26, 2022, the entire contents of which are incorporated herein by reference.

TECHNICAL FIELD

The present disclosure relates to an electronic device for performing token pruning in a frequency domain and a method for operating the same.

BACKGROUND ART

Recently, vision transformer (ViT) family deep learning models have achieved remarkable results in computer vision tasks such as image classification, object detection, image segmentation, and depth estimation. Based on such development, the ViTs are being studied to be actively used in various applications. For example, the ViTs are widely studied for the purpose of processing images in mobile devices, autonomous vehicles, and drones as well as super-large deep learning models, and a number of domestic and foreign companies, including large companies, mid-sized and small-sized companies, and startups, have much interest in the ViTs. Specifically, in order to efficiently utilize ViT-based applications in devices under embedded environments operating based on a battery, it is essential to reduce the computation amount and power consumption through efficient lightweight technology in consideration of network accuracy and a trade-off of computation amount.

It is known that ViT performance increases in proportion to an increase in parameters and the computation amount. However, because the increase in parameters and the computation amount inevitably results in severe power consumption, it may considerably difficult to efficiently utilize the ViTs in mobile devices or autonomous vehicles with limited hardware resources. Many studies have been conducted to compress a network in order to solve such a problem and effectively use the ViTs in various applications. One of the most widely known methods, a pruning scheme, is meant to removes relatively less important tokens, layers, and channels from neural networks.

SUMMARY OF THE INVENTION

An aspect of the present disclosure is to provide a method for pruning tokens of a transformer-based neural network that can reduce the computation amount and improve inference speed by effectively removing tokens with unnecessary high frequency components through frequency conversion.

According to various embodiment of the present disclosure, an electronic device for performing token pruning in a frequency domain may include a processor, and the processor may configured to divide an image frame into a plurality of patches, convert tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, and convert the remaining tokens other than specific tokens from the frequency domain to the spatial domain, after pruning specific tokens from the tokens based on frequency information of the tokens converted into the frequency domain.

According to various embodiments of the present disclosure, a method of operating an electronic device for performing token pruning in a frequency domain may include: dividing an image frame into a plurality of patches using a processor of the electrode device; converting tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, using the processor; and converting the remaining tokens other than specific tokens from the frequency domain to the spatial domain, after pruning specific tokens from the tokens based on frequency information of the tokens converted into the frequency domain, using the processor.

In the present disclosure, high frequency components known to be relatively less important may be removed from an image, and learning may be performed using only low frequency components, thereby not only having a less decrease in accuracy due to lightweightness than a conventional method but also reducing the learning time due to a decrease in the computation amount and reducing a large amount of $CO_2$ generated by a GPU.

DETAILED DESCRIPTION

Hereinafter, embodiments of the present disclosure will be described with reference to the attached drawings. It should be understood that embodiments and the terms used herein are not intended to limit the techniques described herein to specific embodiments, and the invention is to cover all modifications, equivalents, and alternatives falling within the spirit and scope of the invention. Regarding the drawings, like numbers refer to like elements throughout the description of the figures. The singular also includes the plural unless specifically stated otherwise in the phrase. In the present disclosure, the expression "A or B," "at least one of A or/and B," or "one or more of A of/and B" may include all possible combinations of listed items. The expressions, such as "first" and "second", used in the present disclosure can be used to describe various elements without regarding to sequence and/or importance and do not limit corresponding elements but are used only to classify a certain element from another element. When it is described that a certain element (e.g., a first element) is "(operatively or communicatively) coupled with/to" or "connected to" another element (e.g., a second element), it should be understood that the certain element may be connected to another element directly or via another element (e.g., a third element). The expressions "configured to" used in the present disclosure may be interchangeably replaced with, for example, "suitable for," "having the capacity to," "designed to," "adapted to," "made to," or "capable of" in accordance with circumstances. In some cases, the expression "device configured to" may indicate the device "capable of" together with other devices or parts. For example, the wording "processor configured to perform A, B, and C" may indicate an exclusive processor (e.g., an embedded processor) for performing corresponding operations or a generic-purpose processor (e.g., a central processing unit (CPU) or an application processor) capable of performing corresponding operations by executing one or more software programs stored in a memory device.

An electric device according to various embodiments of the present disclosure may include, for example, at least one of a smartphone, a tablet PC, a desktop PC, a laptop PC, a netbook computer, a workstation, and a server.

Figure 1:
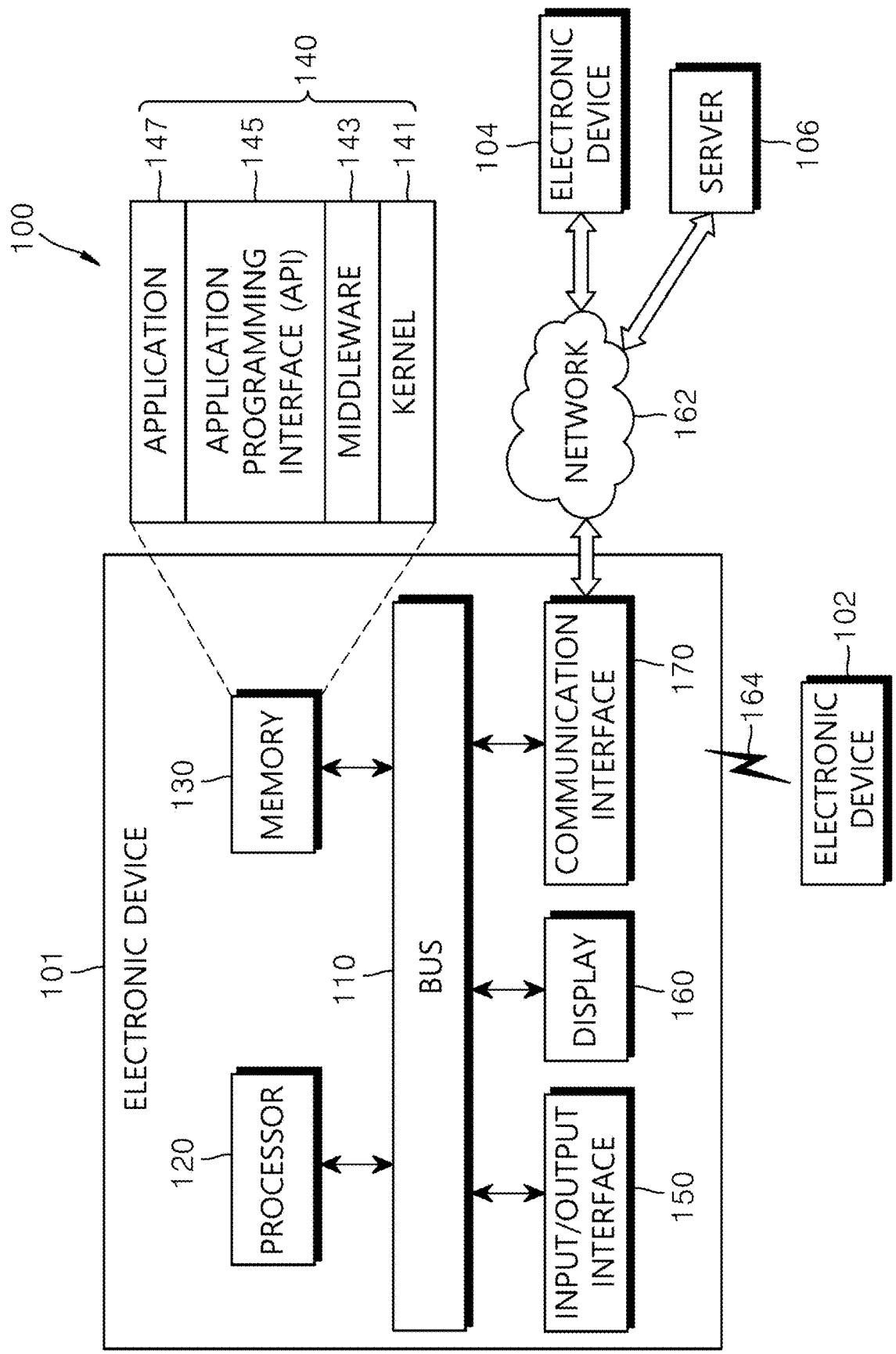
FIG. 1 illustrates a block diagram of an electronic device and a network according to various embodiments of the present disclosure.

Referring to FIG. 1, the electronic device 101 in a network environment 100 is described in various embodiments. The electronic device 101 may include a bus 110, a processor 120, a memory 130, an input/output interface 150, a display 160, and a communication interface 170. In some embodiments, the electronic device 101 may omit at least one of the components or additionally include another component. The bus 110 may include a circuit that connects the components 110-170 to each other and transmits communication (e.g., control messages or data) between the components. The processor 120 may include one or more of a central processing unit, an application processor, or a communication processor (CP). For example, the processor 120 may perform arithmetic operations or data processing regarding control and/or communication of at least one different component of the electronic device 101.

The memory 130 may include volatile and/or nonvolatile memory. The memory 130 may store, for example, instructions or data related to at least one different component of the electronic device 101. According to an embodiment, the memory 130 may store software and/or a program 140. The program 140 may include, for example, a kernel 141, middleware 143, an application programming interface (API) 145 and/or an application program (or "application") 147. At least some of the kernel 141, the middleware 143, or the API 145 may be referred to as an operating system. The kernel 141 may control or manage system resources (e.g., the bus 110, the processor 120, or the memory 130) used to execute operations or functions implemented in other programs (e.g., the middleware 143, the API 145, or the application program 147). In addition, the kernel 141 may provide an interface for controlling or managing system resources by accessing individual components of the electronic device 101 in the middleware 143, the API 145, or the application program 147.

The middleware 143 may serve as an intermediary that enables, for example, the API 145 or the application program 147 to communicate with kernel 141 so as to exchange data. In addition, the middleware 143 may process one or more task requests received from the application program 147 according to their priority. For example, the middleware 143 may assign a priority to at least one of application programs 147 to use system resources (e.g., the bus 110, the processor 120, the memory 130, or the like) of the electronic device 101 and may process the one or more task requests. The API 145 is an interface for allowing the application 147 to control functions provided by the kernel 141 or middle-ware 143, and may include at least one interface or function (e.g., an instruction) for file control, window control, image processing, or character control. The input/output interface 150 may transmit, for example, instructions or data input from the user or other external devices to other component(s) of the electronic device 101, or output instructions or data received from other component(s) of the electronic device 101 to the user or other external devices.

The display 160 may include, for example, a liquid crystal display (LCD), a light emitting diode (LED) display, an organic light emitting diode (OLED) display, a microelectromechanical system (MEMS) display, or an electronic paper display. For example, the display 160 may display various contents (e.g., text, images, videos, icons, and/or symbols) to a user. The display 160 may include a touch screen, and may receive, for example, a touch, a gesture, proximity, or hovering input using an electronic pen or a portion of the user's body. The communication interface 170 may establish communication between, for example, the electronic device 101 and external devices (e.g., a first external electronic device 102, a second external electronic device 104, or a server 106). For example, the communication interface 170 may be connected to a network 162 through wireless communication or wired communication to communicate with the external device (e.g., a second external electronic device 104 or a server 106).

The wireless communication may cellular communication using at least one of, for example, LTE, LTE advance (LTE-A), code division multiple access (CDMA), wideband CDMA (WCDMA), a universal mobile telecommunications system (UMTS), wireless broadband (WiBro), or a global system for mobile communications (GSM). According to an embodiment, the wireless communication may include at least one of, for example, wireless fiber (Wi-Fi), Bluetooth, Bluetooth low power (BLE), Zigbee, near field communication (NFC), magnetic secure transmission, radio frequency (RF), or a body area network (BAN). According to an embodiment, the wireless communication may include a GNSS. The GNSS may be, for example a global positioning system (GPS), a global navigation satellite system (Glonass), a Beidou navigation satellite system (hereinafter referred to as "Beidou") or Galileo, a European global satellite-based navigation system. Hereinafter, in the present disclosure, the "GPS" may be used interchangeably with the "GNSS." The wired communication may include, for example, at least one of universal serial bus (USB), a high-definition multimedia interface (HDMI), a recommended standard 232 (RS-232), power line communication, or a plain old telephone service (POTS). The network 162 may include, for example, at least one of a telecommunication network, a computer network (e.g., a LAN or WAN), the Internet, or a telephony network.

Each of the first and second external electronic devices 102 and 104 may be the same as or different from the electronic device 101. According to various embodiments, all or some of the operations executed in the electronic device 101 may be executed by another electronic device or a plurality of electronic devices (e.g., the electronic devices 102 and 104), or the server 106. According to one embodiment, when the electronic device 101 needs to perform a function or a service automatically or on request, the electronic device 101 may request at least some of the associated functions from another device (e.g., the electronic device 102 or 104, or the server 106, additionally or instead of autonomously executing the function or the service. The electronic device (e.g., the electronic device 102 or 104, or the server 106) may execute the requested function or additional function and transmit results thereof to the electronic device 101. The electronic device 101 may provide the requested function or service by processing the received results intactly or additionally. To this end, for example, cloud computing, distributed computing, or client-server computing technology may be used.

Figure 2:
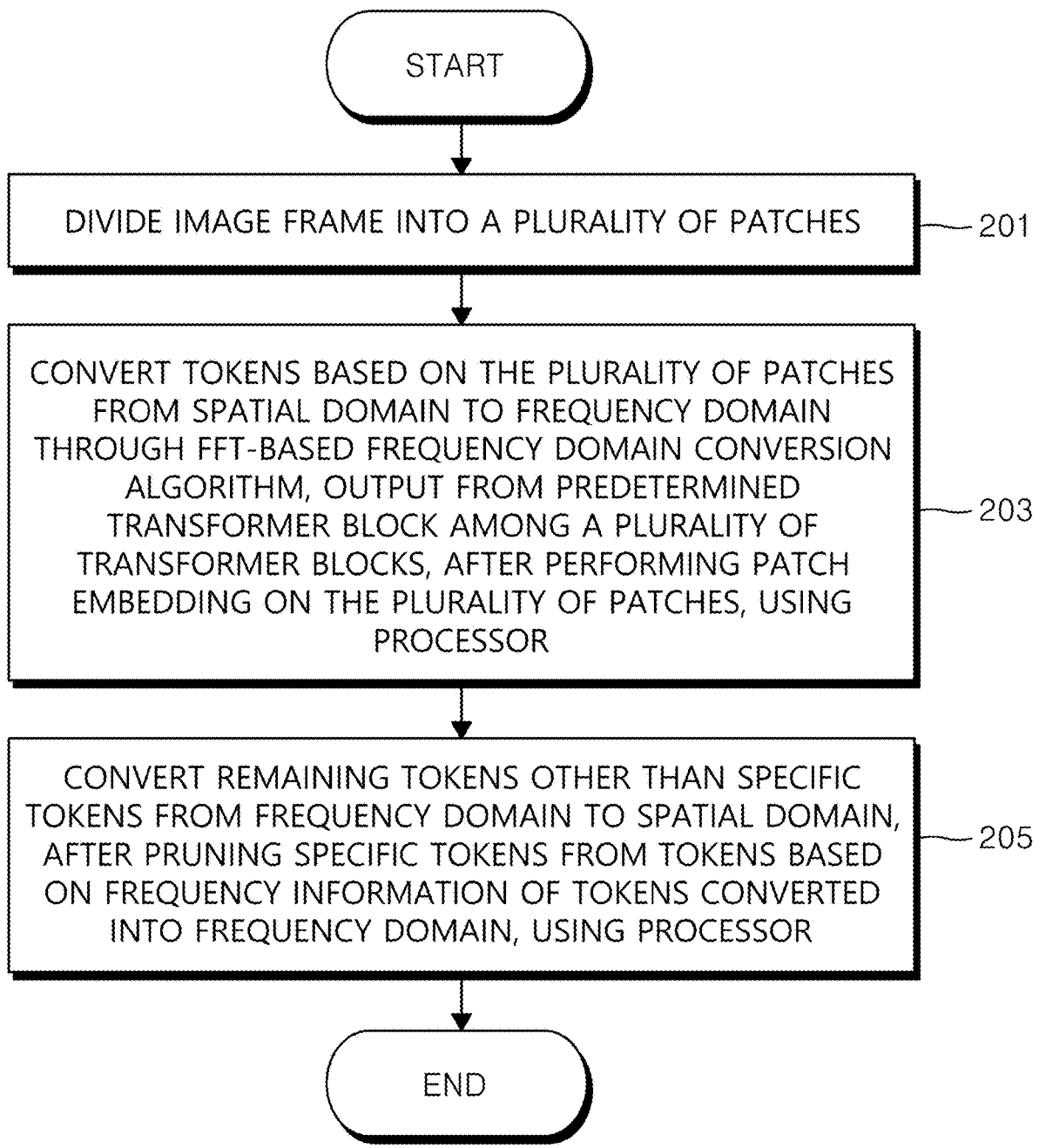
FIG. 2 is a flowchart illustrating a method for performing token pruning by the electronic device according to various embodiments of the present disclosure.

FIG. 2 is a flowchart illustrating a method for performing the token pruning by the electronic device (e.g., the electronic device 101 of FIG. 1) according to various embodiments of the present disclosure.

Figure 3:
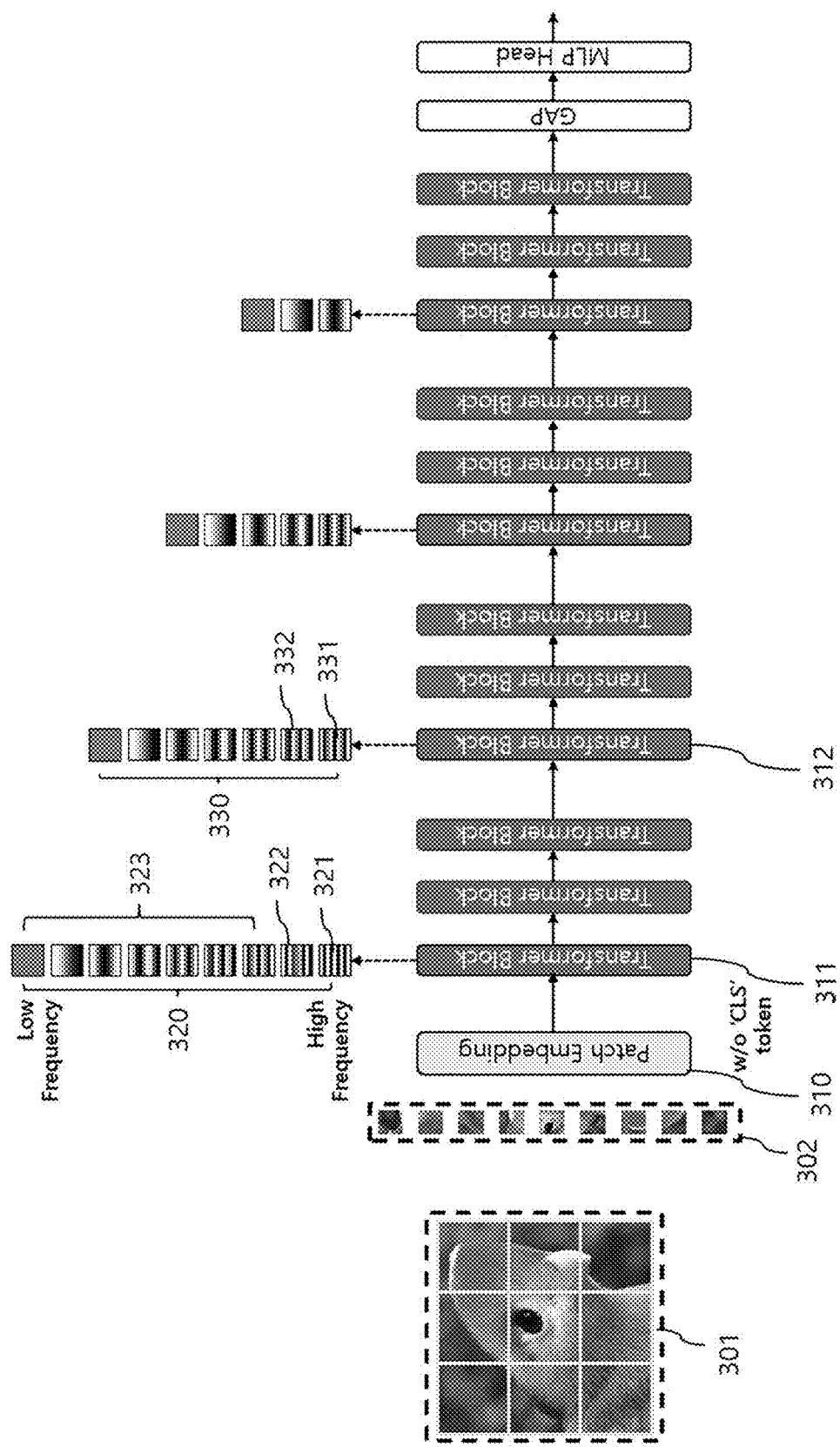
FIG. 3 is a view illustrating an embodiment in which the electronic device 101 performs the token pruning according to various embodiments of the present disclosure.

FIG. 3 is a view illustrating an embodiment in which the electronic device 101 performs the token pruning according to various embodiments of the present disclosure.

In operation 201, according to various embodiments, the electronic device (e.g., the processor 120 of FIG. 1) may divide an image frame into a plurality of patches. According to an embodiment, the electronic device 101 may obtain the image frame from an internal device (e.g., a camera module) or an external device (e.g., an external server), and may divide the obtained image frame into the plurality of patches. For example, referring to FIG. 3, the electronic device 101 may divide one image frame 301 into a plurality of patches 302.

In operation 203, according to various embodiments, the electronic device (e.g., processor 120 in FIG. 1) may perform patch embedding on the plurality of patches, and then convert tokens based on the plurality of patches from a spatial domain to a frequency domain through a fast Fourier transform (FFT)-based frequency domain conversion algorithm, the tokens being output from a predetermined transformer block among a plurality of transformer blocks.

According to an embodiment, the electronic device 101 may perform the patch embedding on the plurality of patches 302. For example, referring to FIG. 3, the electronic device 101 may perform the patch embedding 301 on a plurality of divided patches 302. According to an embodiment, the electronic device 101 may perform the patch embedding without generating a CLS token while performing the patch embedding.

According to an embodiment, the electronic device 101 may identify the tokens output from the predetermined transformer block among the plurality of transformer blocks. In this case, the tokens may be generated based on the plurality of patches. In an embodiment, the image token may refer to each patch of the plurality of patches 302. A transformer is a neural network model referred to as a foundation model that can learn context and meaning by tracking relationships within sequential data. According to an embodiment, there may be provided a plurality of predetermined transformer blocks, which may be selected by the user.

According to an embodiment, the electronic device 101 may convert the tokens output from the predetermined transformer block from the spatial domain to the frequency domain through the FFT-based frequency domain conversion algorithm. According to an embodiment, the FFT-based frequency domain conversion algorithm may include discrete cosine transform (DCT). In this case, DCT refers to a discrete cosine conversion technique, and since the DCT has the advantage of better energy compaction using a cosine function for frequency decomposition, which is the characteristic of better gathering information into one place, it is widely used in image compression technology. According to an embodiment, the predetermined transformer block may be set by a user. For example, referring to FIG. 3, assuming that there is a model including 12 transformer blocks, the user may preset first, fourth, seventh, and tenth transformer blocks to perform the FFT-based frequency domain conversion algorithm on the tokens output from the blocks.

In operation 205, according to various embodiments, the electronic device (e.g., the processor 120 of FIG. 1) may prune specific tokens based on frequency information of the tokens converted into the frequency domain, and then convert the remaining tokens other than the specific tokens from the frequency domain to the spatial domain.

According to an embodiment, the electronic device 101 may prune the specific tokens from the tokens based on the frequency information of the tokens converted into the frequency domain. According to an embodiment, the electronic device 101 may prune the specific tokens from the tokens by the number of tokens selected by the user in the order of a token with the highest frequency to a token with the lowest frequency. For example, referring to FIG. 3, the electronic device 101 may prune a token 321 having the highest frequency and a token 322 having the highest frequency selected by the user among tokens 320 converted into a frequency domain output from the first transformer block 311. For another example, referring to FIG. 3, the electronic device 101 may prune the token 321 having the highest frequency and the token 322 having the second highest frequency by the number of tokens (e.g., two) selected by the user among the tokens 320 output from the predetermined first transformer block 311 and converted into the frequency domain. For another example, referring to FIG. 3, the electronic device 101 may prune the token 331 having the highest frequency and the token 332 having the second highest frequency by the number of tokens (e.g., two) selected by the user among the tokens 330 output from the predetermined second transformer block 312 and converted into the frequency domain. According to an embodiment, the user may set identically or differently the number of tokens to be pruned for each predetermined transformer block.

According to an embodiment, the electronic device 101 may confirm the number of pruned target tokens corresponding to the predetermined transformer block, and may prune the specific tokens from the tokens 320 by number of pruned target tokens from the tokens 320 in the order of a token with the highest frequency to a token with the lowest frequency. The number of pruned target tokens may be preset for each predetermined transformer block. For example, referring to FIG. 3, the number of pruned target tokens corresponding to the predetermined first transformer block 311 may be two, and the number of pruned target tokens corresponding to the predetermined second transformer block 312 may be two. Specifically, referring to FIG. 3, the electronic device 101 may prune the token 321 having the highest frequency and the token 322 having the second highest frequency by the number of pruned target tokens (e.g., two) corresponding to the first transformer block 311 among the tokens 320 output from the predetermined first transformer block 311 and converted to the frequency domain. In addition, the electronic device 101 may prune the token 331 having the highest frequency and the token 332 having the second highest frequency by the number of pruned target tokens (e.g., two) corresponding to the second transformer block 312 among the tokens 320 output from the predetermined second transformer block 312 and converted to the frequency domain.

According to an embodiment, the electronic device 101 may convert the remaining tokens other than the specific tokens from the frequency domain to the spatial domain. For example, referring to FIG. 3, the electronic device 101 may prune the token 321 having the highest frequency and the token 322 having the second highest frequency in the first transformer block 311, and then convert domains of the seven remaining tokens 323 from the frequency domain to the spatial domain.

According to an embodiment, the electronic device 101 may transmit the remaining tokens converted into the spatial domain to a next transformer block.

According to an embodiment, the electronic device 101 may perform a global average pooling (GAP) layer and an MLP head layer after performing an operation of processing the token using the transformer block.

According to various embodiments, the electronic device that performs the token pruning in the frequency domain may include the processor, and the processor may divide the image frame into the plurality of patches, and may convert the tokens based on the plurality of patches, output from the predetermined transformer block among the plurality of transformer blocks through the fast Fourier transform (FFT)-based frequency domain conversion algorithm from the spatial domain to the frequency domain, after performing the patch embedding on the plurality of patches, and based on the frequency information of the tokens converted into the frequency domain, after pruning the specific tokens from the tokens, the processor may be configured to convert the remaining tokens other than the specific tokens from the frequency domain to the spatial domain.

According to various embodiments, the processor may be configured to prune the specific tokens from the tokens by the number of tokens selected by the user in the order of a token with the highest frequency to a token with the lowest frequency.

According to various embodiments, the processor may be configured to confirm the number of pruned target tokens corresponding to the predetermined transformer block.

According to various embodiments, the processor may be configured to prune the specific tokens from the tokens by the number of pruned target tokens in the order of a token with the highest frequency to a token with the lowest frequency.

According to various embodiments, a plurality of predetermined transformer blocks may be provided, predetermined transformer blocks may be selected by a user, and as one of the predetermined transformer blocks, the number of pruned target tokens may be set to x in a first transformer block, and as one of the predetermined transformer blocks, the number of pruned target tokens may be set to y in a second transformer block.

According to various embodiments, the processor may be configured to transmit the remaining tokens to the next transformer block.

According to various embodiments, the processor may be configured to perform the patch embedding without generating the CLS token in the process of performing the patch embedding.

According to various embodiments, a method of operating an electronic device for performing token pruning in a frequency domain may include an operation of dividing the image frame into the plurality of patches using the processor of the electrode device, an operation of converting the tokens based on the plurality of patches from the spatial domain to the frequency domain through the fast Fourier transform (FFT)-based frequency domain conversion algorithm, the tokens being output from the predetermined transformer block among the plurality of transformer blocks, after performing patch embedding on the plurality of patches, using the processor, and an operation of converting the remaining tokens other than specific tokens from the frequency domain to the spatial domain, after pruning specific tokens from the tokens based on frequency information of the tokens converted into the frequency domain, using the processor.

According to various embodiments, the operation of pruning the specific tokens may include an operation of pruning the specific tokens from the tokens by the number of the tokens selected by a user in the order of a token with the highest frequency to a token with the lowest frequency.

According to various embodiments, the operation of pruning the specific tokens may include an operation of confirming the number of pruned target tokens corresponding to the predetermined transformer block.

According to various embodiments, the operation of pruning the specific tokens may include an operation of pruning the specific tokens from the tokens by the number of pruned target tokens in the order of a token with the highest frequency to a token with the lowest frequency.

According to various embodiments, the method of operating an electronic device for performing token pruning in a frequency domain may further include an operation of transmitting the remaining tokens to a next transformer block.

According to various embodiments, the operation of performing the patch embedding may include an operation of performing the patch embedding without a CLS token in the process of performing the patch embedding.

The term "module" or "portion" used in the present disclosure may refer to, for example, a unit including one or more combinations of hardware, software, and firmware. For example, the "module" may be interchangeable with a term, such as "logic," "logical block," "component," "circuit," or the like. The "module" or "portion" may be a minimum unit of a component formed as one body or a part thereof. The "module" or "portion" may be a minimum unit for performing one or more functions or a part thereof. The "module" or "portion" may be implemented mechanically or electronically. For example, the "module" or "portion" according to an embodiment of the present disclosure may include at least one of an application-specific integrated circuit (ASIC) chip, a field-programmable gate array (FPGA), or a programmable-logic device for performing certain operations which have been known or are to be developed in the future, and may be performed by the processor 120. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk)), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

The embodiments disclosed in the present disclosure are presented for explanation and understanding of the disclosed technical content, and are not intended to be limited to the scope of the present disclosure. Therefore, the scope of the present disclosure should be interpreted as including all modifications or various other embodiments based on the technical idea of the present disclosure.

What is claimed is:

1. An electronic device for performing token pruning in a frequency domain, the device comprising:
   a processor,
   wherein the processor is configured to,
   divide an image frame into a plurality of patches,
   convert tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, and
   convert the remaining tokens other than specific tokens from the frequency domain to the spatial domain, after pruning specific tokens from the tokens based on frequency information of the tokens converted into the frequency domain,
   wherein the processor is configured to prune the specific tokens from the tokens by the number of the tokens selected by a user in the order of a token with the highest frequency to a token with the lowest frequency.

2. An electronic device for performing token pruning in a frequency domain, the device comprising:
   a processor,
   wherein the processor is configured to,
   divide an image frame into a plurality of patches,
   convert tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, and
   convert the remaining tokens other than specific tokens from the frequency domain to the spatial domain, after pruning specific tokens from the tokens based on frequency information of the tokens converted into the frequency domain,
   wherein the processor is configured to confirm the number of pruned target tokens corresponding to the predetermined transformer block.

3. The electronic device according to claim 2,
   wherein the processor is configured to prune the specific tokens from the tokens by the number of pruned target tokens in the order of a token with the highest frequency to a token with the lowest frequency.

4. The electronic device according to claim 3,
   wherein a plurality of predetermined transformer blocks are provided,
   the predetermined transformer blocks are selected by a user,
   as one of the predetermined transformer blocks, the number of pruned target tokens is set to x in a first transformer block, and
   as one of the predetermined transformer blocks, the number of pruned target tokens is set to y in a second transformer block.

5. The electronic device according to claim 1,
   wherein the processor is configured to transmit the remaining tokens to a next transformer block.

6. The electronic device according to claim 1,
   wherein the processor is configured to perform the patch embedding without a CLS token in the process of performing the patch embedding.

7. A method of operating an electronic device for performing token pruning in a frequency domain, the method comprising:
   dividing an image frame into a plurality of patches using a processor of the electronic device;
   converting tokens based on the plurality of patches from a spatial domain to a frequency domain through a fast Fourier transform (FFT)-based frequency domain conversion algorithm, the tokens being output from a predetermined transformer block among a plurality of transformer blocks, after performing patch embedding on the plurality of patches, using the processor; and
   converting the remaining tokens other than specific tokens from the frequency domain to the spatial domain, after pruning specific tokens from the tokens based on frequency information of the tokens converted into the frequency domain, using the processor,
   wherein the operation of pruning the specific tokens comprises pruning the specific tokens from the tokens by the number of the tokens selected by a user in the order of a token with the highest frequency to a token with the lowest frequency.

8. The method according to claim 7, wherein the pruning the specific tokens comprises confirming the number of pruned target tokens corresponding to the predetermined transformer block.

9. The method according to claim 8, wherein the pruning the specific tokens comprises pruning the specific tokens from the tokens by the number of pruned target tokens in the order of a token with the highest frequency to a token with the lowest frequency.

10. The method according to claim 9, wherein a plurality of predetermined transformer blocks are provided,
    the predetermined transformer blocks are selected by the user,
    as one of the predetermined transformer blocks, the number of pruned target tokens is set to x in a first transformer block, and
    as one of the predetermined transformer blocks, the number of pruned target tokens is set to y in a second transformer block.

11. The method according to claim 7, further comprising:
    transmitting the remaining tokens to a next transformer block.

12. The method according to claim 7, wherein the performing the patch embedding comprises performing the patch embedding without a CLS token in the process of performing the patch embedding.

* * * * *